Figure 1:
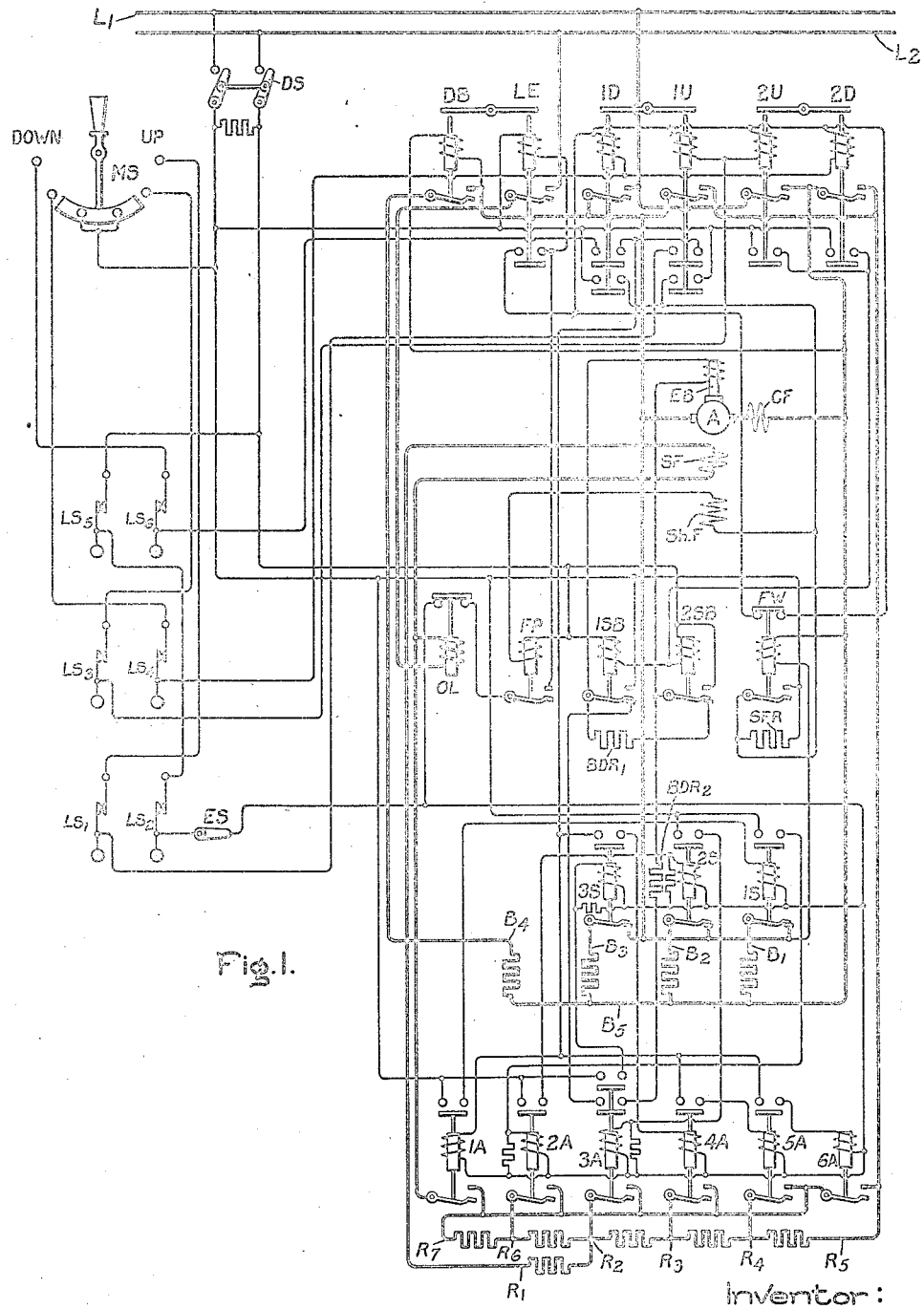

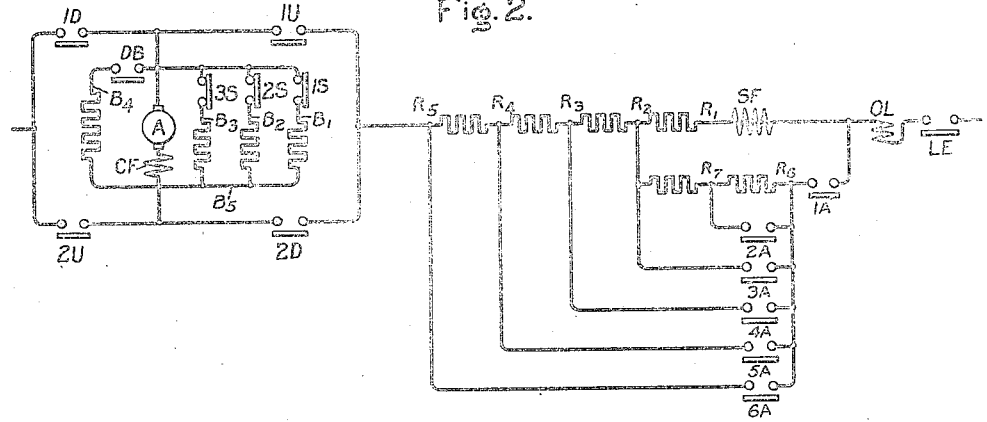

Patented June 7, 1927.

1,631,673

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR-CONTROL SYSTEM.

Application filed September 26, 1925. Serial No. 58,940.

My invention relates to improvements in motor control systems and has for its objects a simplification of prior systems and an improvement in the operating characteristics thereof.

Although electric elevator motor control systems present problems for which the invention provides a solution, and while the invention is particularly applicable to such systems, nevertheless the invention is applicable generally in the control of the acceleration and retardation of electric motors by means of separately operable electromagnetic switches or contactors under the control of a master switch.

One of the features of the invention is an arrangement whereby the operation of a portion of the contactors at times effects a direct control of the motor and at other times effects merely an indirect control of the motor, as for instance by the contactors of this portion serving as timing devices for others of the contactors which of themselves directly control the motor. This feature of the invention is utilized in the form of the invention which I have selected for purposes of explanation, wherein a plurality of contactors directly control the motor speed during acceleration, as for instance by controlling resistors in the motor circuit, and then a portion of the contactors serve as timing devices for others of the contactors during the retardation of the motor speed, the said portion of the contactors producing no direct effect of themselves on the control of the motor speed during retardation except through the control exerted thereby on the other of the contactors which directly affect the motor speed by their operation. A simplification and improvement of the control is thus affected in that the contactors of this portion perform a double function and eliminate the necessity of separate devices for controlling the operation of the other of the contactors.

A further feature of the invention is directed to an improvement in the control of the shunting of the motor armature to obtain reduced speed operation of the motor. It has heretofore been customary to shunt the motor armature by a resistor and shunt the resistor section by section in order to effect a speed reduction. This is objectionable since a portion of the resistor is thus required to carry the entire current shunted from the armature at all times and this portion must therefore be of relatively large dimensions to take care of the heating effect. In accordance with my invention, the armature shunt is composed of a plurality of resistors which are arranged in multiple with each other and with the motor armature, the resistors being cut into circuit and out of circuit by successively operated contactors. Thus for the low resistance shunt condition, all of the resistors are included in circuit and each resistor dissipates its portion of the heating effect instead of requiring that the entire heating effect be dissipated by only a portion of the sections of the resistance as in the prior arrangement.

Another feature of the invention is directed to an arrangement whereby the contactors controlling the resistors in series relation with the motor armature are alternately operated with the contactors controlling the armature shunt resistors, thus obtaining a great nicety of speed regulation by controlling the increments of speed change effected by the operation of the contactors.

Another feature of the invention is an arrangement whereby the control of the motor is effected by utilizing the inherent time delay of operation of the speed regulating contactors so that for certain applications of the invention, no separate controlling devices for regulating the response of the contactors are necessary.

For a better understanding of the invention reference is had to the accompanying drawing, in which Fig. 1 is a reversing motor control system in accordance with the invention, Fig. 2 is an elementary diagram showing only the main motor circuits for the purpose of readily explaining the interconnections of the various resistors controlling the motor and the sequence of operation of the various electromagnetic switches or contactors in the main motor circuit, and Fig. 3 is a table showing the contactors which are closed in various positions of the master switch.

Referring to the drawings, the electric motor having an armature A, a commutating field CF, a series field SF, and a shunt field Sh.F, is arranged to drive any suitable device such as an elevator, hoist or the like. The motor control system of Fig. 1 is shown in detail in the manner in which the invention is applied to the control of an electric motor operating an elevator. The motor is arranged for control by means of the reversing master switch MS, which in an elevator control system will ordinarily be a car switch which is carried by the car and operated by the elevator operator. This master switch controls the motor through a plurality of contactors and various relays which are interconnected in the manner shown in Fig. 1 and as will be hereinafter described more in detail.

The motor is arranged to be connected to the source of supply $L_1L_2$ for the up direction of the elevator by means of the directional contactors 1U and 2U, and to be connected to the source of supply for the down direction of operation by means of the directional contactors 1D and 2D. Each of these contactors has main contacts included in in the main motor circuit and the familiar auxiliary switches which govern control circuits as will be hereinafter described more in detail. The line contactor LE is provided for connecting the motor to the supply circuit for each direction of motor operation and this contactor is provided for the familiar purpose of automatically disconnecting the motor from the supply circuit upon a failure of voltage of the supply circuit. The contactor designated DB is mechanically interlocked with the line contactor LE, and controls a dynamic brake circuit for the motor armature including the resistor $B_4$—$B_5$. The winding of this contactor DB is energized across the motor armature and is mechanically held from closing by the interlock connecting this contactor with the line contactor. This arrangement is the customary one in which when the motor is disconnected from the source of supply by the opening of the line contactor, the motor armature is automatically included in a dynamic brake circuit so as to bring the motor to rest promptly.

A plurality of resistors are included in series relation with the motor armature and a plurality of resistors are included in shunt relation with the motor armature and in shunt relation with each other. This feature of the invention will be most easily understood in connection with Fig. 2. By reference to this figure it will be seen that there is what amounts to a series parallel arrangement of what I shall term the "series resistors", namely that the resistor $R_1$—$R_2$ is arranged to be connected in multiple relation with the resistors $R_6$—$R_7$ and $R_7$—$R_2$ when the resistor controlling switch 1A is closed, and that this multiple circuit is in series relation with the resistors $R_2$—$R_3$, $R_3$—$R_4$ and $R_4$—$R_5$. The resistors $R_6$—$R_7$ and $R_7$—$R_2$ are connected so as to be included in a multiple circuit with the series field SF of the motor for the purpose of increasing the motor speed by reducing the current through the series field.

This connection of the resistors has another important function in the system of control in that in case the resistor contactor 1A is opened with the resistor contactors 2A and 3A maintained energized and closed, the subsequent opening of the contactors 2A and 3A produces no direct effect on the control of the motor speed by the control thereof on their respective resistors, but as will be hereinafter described more in detail, these contactors 2A and 3A serve as time element controlling means for others of the contactors controlling the motor speed. The resistor contactor 4A is connected so as to shunt the resistor $R_2$—$R_3$, the resistor contactor 5A is arranged to shunt the resistor $R_2$—$R_4$ and the resistor contactor 6A is arranged to shunt the resistor $R_4$—$R_6$. The resistors $B_1$—$B_5$, $B_2$—$B_5$, $B_3$—$B_5$, are what are termed armature shunt resistors and it will be observed that the resistors are connected in multiple relation with the motor armature and in multiple relation with each other. The resistor $B_1$—$B_5$ is controlled by the normally closed contactor 1S, the resistor $B_2$—$B_5$ is controlled by the normally closed contactor 2S and the resistor $B_3$—$B_5$ is controlled by the normally closed contactor 3S.

Each of the previously mentioned resistor contactors, with the exception of the contactor 6A, is provided with auxiliary switch contacts which control automatically the desired sequence of operation of the contactors, as will be explained in detail more hereinafter. With this arrangement, each of the contactors, with the exception of contactor 6A, serves not only to directly control a resistor, but also to perform the function of a timing device for introducing a time interval of operation between the successive control of the resistors. In general it may be said that the armature shunt resistors are alternately controlled with the armature series resistors so as to thereby effect a nicety in the control of the speed of the motor by accelerating the motor in a comparatively large number of steps, each of which effects a comparatively small increment of speed variation.

The field protective relay FP is provided for the usual purpose, namely that of opening the line contactor, and the various control circuits for the motor in case the circuit of the shunt field of the motor is opened. The relays 1SB and 2SB are provided for controlling the winding of the electromagnetic brake EB, these relays being arranged to include the winding of the brake across the supply circuit when the selected set of directional contactors is closed, and when the directional contactors are opened to include the brake winding in a local discharge circuit with the resistor BDR1. The relay designated FW is provided for controlling the resistor SFR to limit the current through the shunt field of the motor until the motor has accelerated to a predetermined value and then increase the shunt field excitation, this relay is also provided for limiting the heating of the shunt field of the motor when the motor is at rest during intervals of operation of the master switch. The limit switches $LS_1$ to $LS_6$ inclusive are the the customary track limit switches provided in an electric elevator equipment. These limit switches are provided for the usual purpose of preventing the elevator cage from proceeding past predetermined points in the elevator hatchway. The manually operable switch ES is what is termed an emergency switch provided for the usual purpose in an elevator control equipment. Briefly stated, the function of this switch is to effect the disconnection of the motor from the supply circuit and the inclusion of the motor armature in the local dynamic brake circuit previously referred to in case of some unusual condition. This switch will ordinarily be a push button switch within convenient reach of the operator.

With the above general understanding of the functions and the connections of the various parts of the system, I shall now proceed to a description of the operation of the system as indicated in Fig. 1, it being assumed that the various parts of the system are in their respective positions as indicated in Fig. 1.

When the disconnecting switch DS in the control circuit is closed—controller or master switch MS in the off position—the motor shunt field Sh.F is energized through the circuit from $L_1$, resistor SFR controlled by field contactor FW, motor shunt field Sh.F, coil of field protective contactor FP to $L_2$. The field protective contactor FP is thus energized to close and energize the coil of LE line contactor through the circuit $L_1$, contacts of FP, contacts of overload relay OL, emergency switch ES, track limit switches $LS_2$ and $LS_5$ to $L_2$.

Assume that the car switch or controller MS is thrown toward the left to the final position, the reversing contactors 1U and 2U are energized to close through the circuit $L_1$, master switch second right hand contact from top, limit switch $LS_3$, reversing contactor coils, auxiliary switch on line contactor LE, contacts of field protective relay FP, overload relay OL, emergency switch ES, limit switches $LS_2$ and $LS_5$ to $L_2$. The closing of the auxiliary switch associated with the directional contactor 2U energizes relays 1SB and 2SB from $L_1$, auxiliary switch of 2U, 1SB and 2SB coils, to $L_2$, thus opening the discharge circuit for the winding of the electromagnet brake. The closing of 1SB and 2SB effects the energization of brake magnet EB, and the brake is released. The lower auxiliary switch on 1U establishes a shunt about the shunt field resistor SFR controlled by relay FW. The relay FW is energized to close in response to the voltage across the terminals of the motor armature. The coil of contactor 1A is energized from $L_1$, upper right contact of master switch, limit switch $LS_1$, upper auxiliary switch on contactor 1U, coil of 1A, emergency switch ES, limit switch $LS_2$, limit switch $LS_5$ to $L_2$.

Closing of resistor contactor 1A connects two sections of starting resistor ($R_7$—$R_6$ and $R_7$—$R_2$) in multiple relation with the motor series field and the resistor section $R_1$—$R_2$, thus forming a series parallel relation of the resistors in the armature circuit and reducing the current in the series field of the motor. The closing of the auxiliary switch on 1A energizes the coil of armature shunt resistor contactor 1S, and the opening of this contactor increases the motor armature shunt resistance. Closing of auxiliary switch of 1S upon the opening of this contactor energizes coil of 2A, causing this contactor to close and shunt resistor $R_6$—$R_7$. This reduces the current in the series field of the motor, causing the motor speed to increase. The closing of the auxiliary switch on 2A causes the coil of 2S to be energized, and the opening of contactor 2S further increases the armature shunt resistance. The auxiliary switch of 2S in closing effects the energization of the coil of contactor 3A and the closing of this contactor shunts resistor $R_7$—$R_2$. The armature shunt resistor contactor 3S is energized to open through the upper auxiliary switch of the contactor 3A, and the closing of the lower auxiliary switch of 3A produces no result at this time, although it partially completes a circuit through the shunt brake discharge resistor $BDR_2$. The opening of 3S contactor and the closing of the auxiliary switch of this contactor effects the energization of contactor 4A, and this contactor in closing energizes 5A, and 5A in closing energizes 6A.

When master switch is returned to the off position, 1U and 2U contactors open and the circuit for the coils of contactors 1A, 4A, 5A and 6A is opened at the master switch and at the upper auxiliary switch of 1U contactor. The auxiliary switch of the 2U contactor opens with the opening of this contactor and deenergizes the 1SB and 2SB relays, thus including the brake magnet EB in a local discharge circuit with the resistors $BDR_1$ and $BDR_2$, the brake magnet being disconnected from the supply by the opening of the 1SB and 2SB relays.

Since the armature shunt resistor contactors 1S, 2S and 3S are now energized from the supply circuit independently of the car switch MS, these contactors remain closed temporarily after the return of the master switch to reduce the motor speed. The contactors 2A and 3A are also energized independently of the car switch and remain closed.

The opening of the interlock of the 1A resistor contactor deenergizes the 1S contactor and the closing of 1S contactor opens its associated auxiliary switch and deenergizes the coil of the 2A contactor. The opening of the auxiliary switch of contactor 2A deenergizes contactor 2S and the closing of contactor 2S and the opening of its auxiliary switch deenergizes the 3A contactor. The opening of the 3A contactor deenergizes the 3S contactor at the upper auxiliary switch of 3A, and also opens the circuit through $BDR_2$ at the lower auxiliary switch of contactor 3A. The closing of 3S contactor opens the circuit for the 4A contactor. The FW relay opens when the motor has practically stopped rotating since the coil of this relay is energized by C. E. M. F., and the SFR resistor is included in the motor field circuit to reduce the heating of the motor field.

It will thus be observed that during acceleration the sequence of operation of the various resistor contactors after the closing of the selected directional switches and the closing of the line switch is as follows: First the 1A contactor closes, followed by the opening of the 1S contactor to open the circuit to the armature shunt resistor $B_1$—$B_5$ and thus increase the armature shunt resistance. The opening of the 1S contactor energizes the contactor 2A to close and shunt the resistor $R_6$—$R_7$, and the closing of this contactor in turn energizes the armature shunt resistor contactor 2S to open and open the circuit through the resistor $B_2$—$B_5$, thus accelerating the motor by reducing the current through the series field of the motor and by increasing the resistance of the shunt path about the motor armature. It will be observed that these respective steps of the control effect relatively small increments of speed change in the motor. The opening of the contactor 2S effects the energization of the contactor 3A to shunt the resistor $R_2$—$R_7$ and further decrease the current of the series field of the motor. The closing of contactor 3A in turn effects the closing of the armature shunt resistor contactor 3S and thus removes all of the resistance about the motor armature. The opening of the 3S contactor effects the energization of the 4A contactor and this contactor shunts the armature series resistor $R_2$—$R_3$. The contactors 5A and 6A are then energized in sequence to shunt their respective series resistors.

It will be observed that by reason of the connections including the contactor 1A, when the master switch is returned from a full running position to either the off position or a reduced speed position, this contactor is opened and the opening of this contactor includes all of the resistors $R_1$ to $R_5$ in the motor armature circuit so that the contactors 2A, 3A, 4A, 5A and 6A are unable to produce any direct effect on the control of their respective resistors during the retardation of the motor speed. It will also be observed that by reason of the fact that the contactors 2A and 3A are maintained energized independently of the master switch, when the master switch is returned from the full running position to either the off position or to a reduced speed position, these contactors will remain closed, and it is to be noted in this connection that these contactors now function as time element controlling means for regulating the connection of the armature shunt resistors in shunt relation with the motor armature. Thus, the opening of the 1A contactor effects the deenergization of the 1S contactor and this latter contactor closes so as to include the resistor $B_1$—$B_5$ in shunt relation with the motor armature to accomplish the well known speed retardation effect. The closing of the 1S contactor effects the deenergization of the 2A contactor so that this latter contactor opens without producing any direct effect of itself on the control of the motor speed but the contactor nevertheless serves as a time element controlling means for the 2S contactor.

In order to render the contactors 2A, 3A, 2S and 3S more effective in their functions as time element controlling means, each of these contactors has a resistor included about the contactor winding, these resistors providing a local discharge circuit for the contactor windings when the windings are disconnected from the supply circuit.

The opening of the 2A contactor deenergizes the 2S contactor, thereby causing this latter contactor to close and include the resistor $B_2$—$B_5$ in multiple relation with the motor armature and the resistor $B_1$—$B_5$. The closing of the 2S contactor effects the deenergization of the 3A contactor, but as previously explained, the opening of this latter contactor produces no direct effect on the motor speed, since this contactor now functions solely as a time element controlling means for the 3S contactor. The closing of the 3S contactor under the control of the 3A contactor in turn effects a further reduction in the speed of the motor by reducing the resistance of the shunt about the motor armature.

When the master switch is returned from the final up position to the first up position, the 1U and 2U contactors remain energized but the 1A, 4A, 5A and 6A contactors are deenergized and these contactors open, thus reinserting the resistors $R_2$—$R_5$ in the motor armature circuit and opening the shunt about the series field SF. The speed of the motor is reduced both by reason of the inclusion of the resistors in the motor armature circuit and by reason of strengthening the motor series field. The resistor contactor 1A in opening, deenergizes the 1S contactor and the alternate opening of the armature series resistor contactors and the closing of the armature shunt resistor contactors previously explained now proceeds. The motor speed is thus reduced in a plurality of relatively small increments of the definite low value determined by the value of the resistance about the motor armature, the resistors in series relation with the motor armature and the resistors which shunt the series field of the motor.

In case the master switch is returned to the off position, the 1SB and 2SB relays are deenergized by the opening of the respective directional contactors, thus disconnecting the winding of the electromagnet brake from the supply circuit and including the brake winding in a local discharge circuit which includes the resistor BDR1. It will also be observed that the brake discharge resistor BDR2 is controlled by the lower auxiliary switch of the contactor 3A so that until this contactor is opened, the two resistors BDR1 and BDR2 will be included in multiple in the local discharge circuit for the brake winding. The opening of the 3A contactor increases the resistance of this local discharge path so as to quicken the setting action of the brake.

It will be understood that when the master switch MS is thrown to the right to effect operation of the elevator in the down direction, the 1D and 2D directional contactors will be energized to reverse the connection of the motor armature to the source of supply. When these directional contactors are closed, the operation of the equipment is the same as previously described. It is believed that those skilled in the art will readily understand the various circuit connections employed for producing the desired result, especially since a detailed explanation of the connections established during the hoisting operation of the motor has been previously given.

What I claim as new and desire to secure by Letters Patent of the United States, is:

1. In combination in a system of motor control, means including a plurality of electromagnetic switches for controlling the motor speed, and connections through which said switches control the motor to at times exert a direct effect on the control of the motor speed and at other times a portion thereof serves solely as time element controlling means for other of said switches.

2. In combination in a system of motor control, means including a plurality of electromagnetic switches for controlling the motor speed, a plural position master switch for controlling said switches, and connections through which said switches directly control the motor speed under the control of said master switch in certain of the positions thereof and in certain other of the positions thereof a portion of said switches serves solely as time element controlling means for other of said switches the operation of which directly governs the motor speed.

3. In combination in a system of motor control, a plurality of resistors for controlling the motor speed, a contactor for controlling each of said resistors, a master switch for controlling said contactors, and connections between said resistors controlled by said master switch such that for a certain operation of the master switch said contactors directly control their respective resistors and for certain other of the operations of the master switch a portion of said contactors serves solely as time element controlling means for other of said switches to control the motor speed.

4. In combination, an electric motor, a plurality of series parallel connected resistors included in series relation with the motor armature, a plurality of resistors included in shunt relation with the motor armature, a separate contactor for controlling each of said resistors, a plural position master switch, and connections between the contactors through which said master switch controls the contactors for said series parallel resistors for certain operations of the master switch to directly shunt their respective resistors and for certain other operations of the master switch a portion of said series parallel resistor contactors serves solely as time element controlling means for the contactors controlling said armature shunt resistors.

5. In combination in a system of motor control, an electric motor, a plurality of successively operated contactors for directly controlling the motor during the acceleration thereof, a master switch having a partial speed position and a higher speed position for controlling the motor through said contactors, and connections through which a portion of said contactors serve as timing devices for others of said contactors which directly control the motor speed when the said controller is moved from said higher speed position to said partial speed position to effect a reduction in the motor speed, the said portion of the contactors producing no effect in the control of the reduction of the motor speed except through the time delay introduced thereby in the control of said others of said contactors.

6. In combination, an electric motor, a plurality of series parallel connected resistors included in series relation with the motor armature, a plurality of resistors included in shunt relation with the motor armature, a separate contactor for controlling each of said resistors, a master switch having a partial speed position and a higher speed position for controlling said contactors, and connections through which a portion of the said series parallel resistor contactors serve solely as timing devices for the contactors controlling said armature shunt resistors when said master switch is moved from the higher speed position thereof to the lower speed position thereof.

7. In combination in a system of motor control, a plurality of resistors for controlling the motor speed, a plurality of successively operated contactors for controlling said resistors, a master switch for controlling said contactors, and connections between the said resistors governed by a portion of said contactors under the control of said master switch through which a relation of the resistors is established that for certain operations of the master switch the remainder of the contactors each shunts an associated resistor and effects a variation of the motor speed and for other operations of said master switch another relation of said resistors is established that a portion of said contactors serve solely as time element controlling means for others of said contactors which respectively shunt associated resistors.

8. In combination, an electric motor, a plurality of armature series resistors connected in series relation with the armature of said motor, a plurality of armature shunt resistors connected in multiple relation with each other and in multiple relation with said armature, a separate contactor for controlling each of said resistors, the contactors controlling said armature shunt resistors being normally closed and the contactors controlling said armature series resistors being normally open, and connections between said contactors through which the motor is automatically accelerated with a time interval effect intrduced by the inherent time of action of said contactors by alternately energizing said armature series resistor contactors and said armature shunt resistor contactors.

9. In combination, an electric motor, a master switch for controlling the same, a pair of directional switches under the control of said master switch for controlling the connection of the motor to a source of supply for a selected direction of operation, a plurality of armature series resistors connected in series relation with the motor, a plurality of armature shunt resistors connected in multiple relation with each other and in multiple relation with the motor armature, a separate contactor for each of said resistors, the contactors controlling said armature shunt resistors being normally closed and the contactors controlling said armature series resistors being normally open, and connections through which said contactors are energized from the source of supply independently of control by said master switch to automatically operate in a definite succession upon the operation of a selected directional switch, the said armature shunt resistor contactors being alternately operated with the said armature series resistor contactors.

In witness whereof, I have hereunto set my hand this 23d day of September, 1925.

JOHN EATON.

Certificate of Correction.

Patent No. 1,631,673.                 Granted June 7, 1927, to

JOHN EATON.

It is hereby certified that error appears in the printed specification of the above-numbered patent requiring correction as follows: Page 2, line 22, strike out the word "in", first occurrence; line 85, for "$R_2—R_4$" read $R_3—R_4$; line 89, for the article "the" read *these;* and that the said Letters Patent should be read with these corrections therein that the same may conform to the record of the case in the Patent Office.

Signed and sealed this 19th day of July, A. D. 1927.

[SEAL.]                                  M. J. MOORE,
*Acting Commissioner of Patents.*